United States Patent Office 3,349,084
Patented Oct. 24, 1967

3,349,084
STEROIDAL [16,17-d]-2'-ISOXAZOLINES OF THE PREGNANE SERIES
Donald E. Ayer, Portage, and John E. Pike, Kalamazoo, Mich., assignors to The Upjohn Company, Kalamazoo, Mich., a corporation of Delaware
No Drawing. Filed May 17, 1965, Ser. No. 456,521
18 Claims. (Cl. 260—239.55)

This invention relates to [16,17-d]-2'-isoxazolines of the pregnane series and to the preparation thereof. More particularly it relates to pregnano, 4-pregneno-, 1,4-pregnadieno-, 4,6-pregnadieno- and 1,4,6-pregnatrieno-[16,17-d]-2'-isoxazolines and to methods for the preparation thereof.

The compounds of this invention are represented by the following structural formulae:

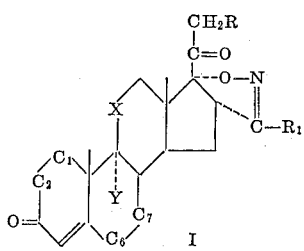

and

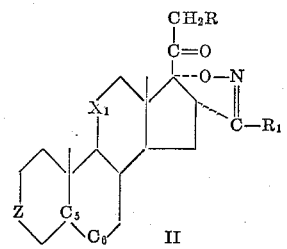

wherein R is hydrogen, hydroxy, or acyloxy, in which acyl is the acyl radical of an organic carboxylic acid, preferably a hydrocarbon carboxylic acid of 1 to 12 carbon atoms, inclusive; $R_1$ is hydrogen, lower-alkyl, aryl, halogen, carboxy or carbalkoxy; X is methylene, β-hydroxymethylene or carbonyl; $X_1$ is methylene, β-hydroxymethylene, α-hydroxymethylene or carbonyl; Y is hydrogen, fluorine or chlorine; Z is carbonyl, α-hydroxymethylene, β-hydroxymethylene, α-acyloxymethylene or β-acyloxymethylene, in which acyl has the meaning given above; —$C_1$—$C_2$— is the divalent radical —$CH_2$—$CH_2$— or —CH=CH—; —$C_6$—$C_7$— is the divalent radical

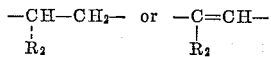

in which the $R_2$ at the 6-position is hydrogen, methyl, fluorine or chlorine; —$C_5$—$C_6$— is the trivalent radical

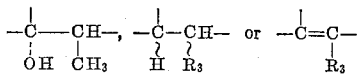

in which the $R_3$ at the 6-position is hydrogen or methyl, and wherein when X is methylene Y is limited to hydrogen.

In this application the wavy lines appearing at the 5- and 6-positions of the structural formulae indicate the α-configuration, the β-configuration and mixtures thereof.

The term "hydrocarbon carboxylic acid containing from 1 to 12 carbon atoms, inclusive" means saturated and unsaturated aliphatic and aromatic carboxylic acids having the required number of carbon atoms, such as acetic, propionic, butyric, isobutyric, pivalic, valeric, isovaleric, caproic, caprylic, decanoic, dodecanoic, acrylic, crotonic, hexynoic, heptynoic, octynoic, cyclobutanecarboxylic, cyclopentenecarboxylic, cyclohexanecarboxylic, dimethylcyclohexanecarboxylic, benzoic, toluic, naphthoic, ethylbenzoic, phenylacetic, naphthaleneacetic, phenylvaleric, cinnamic, phenylpropiolic, phenylpropionic, p-butoxyphenylpropionic, succinic, glutaric, dimethylglutaric, maleic, cyclopentylpropionic acids, and the like. The term "lower-alkyl" means an alkyl radical containing from 1 to 8 carbon atoms, inclusive, such as methyl, ethyl, propyl, butyl, amyl, hexyl, heptyl, octyl and isomeric forms thereof. The term "aryl" means an aryl radical containing from 6 to 12 carbon atoms, inclusive, such as phenyl, tolyl, xylyl, naphthyl, biphenyl and ortho, meta and para (o-, m- and p-) substituted derivatives of phenyl wherein the attached substituents can be lower-alkyl as hereinbefore defined, nitro, amino, cyano, hydroxy or halogen as hereinafter defined, etc. The term "halogen" means fluorine, chlorine, bromine or iodine. The term "carbalkoxy" means a radical of the formula —$COOR_4$ in which $R_4$ is lower-alkyl as hereinbefore defined.

The compounds of this invention having the Formulae I and II above, are useful for fertility control, for pregnancy maintenance and as anti-inflammatory agents effective for the treatment of rheumatoid arthritis, allergies, hay fever, asthma and related conditions. In addition the compounds of this invention are useful antibacterial, antiviral and antifungal agents. The compounds of this invention are characterized by a favorable therapeutic ratio; effects on the pituitary-adrenal axis are minimal, electrolyte balance is not seriously disturbed and ulcerogenic activity is low.

The novel compounds of this invention having the Formulae I and II above, are useful in the treatment of animals and birds, and are particularly useful in the treatment of valuable domestic animals. They can be administered in conventional dosage forms, such as pills, tablets, capsules, syrups, or elixirs for oral use, or in liquid forms which are sutiable for injectable products. They can also be administered topically in the form of ointments, creams, lotions, and the like, with or without coacting antibiotics, germicides or other materials forming advantageous combinations therewith. In addition to their usefulness as physiologically and pharmacologically active agents the compounds of Formulae I and II are useful as intermediates in the preparation of other useful steroids as hereinafter described.

The compounds of Formulae I and II are prepared from the corresponding $\Delta^{16}$-20-oxo-steroids which are illustratively represented by the following structural formulae:

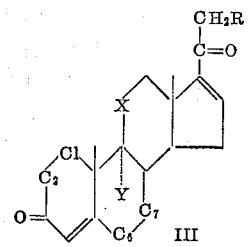

and

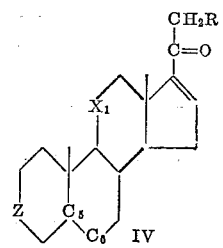

wherein R, X, X₁, Y, Z, —C₁—C₂—, —C₅—C₆— and —C₆—C₇— have the meanings and limitation hereinbefore defined, and functional derivatives thereof such as 3-alkylene ketals.

The starting compounds (III), wherein —C₁—C₂— is —CH₂—CH₂—; —C₆—C₇— is the saturated radical

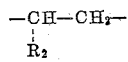

in which R₂ is hydrogen; Y is hydrogen and X is β-hydroxymethylene or carbonyl, are known compounds which can be prepared using the procedure described by Allen and Bernstein, J. Am. Chem. Soc., 77, 1028 (1955). The corresponding compounds wherein R₂ is 6α-methyl, 6α-fluoro or 6α-chloro can be prepared using the same procedure by employing the corresponding 6α-methyl, 6α-fluoro and 6α-chloro cortisones and hydrocortisones as starting materials. The corresponding 11-desoxy Δ¹⁶-compounds of Formula III can be prepared in the same manner from the corresponding 17α-hydroxydeoxycorticosterones.

The starting compounds (III) wherein Y is fluorine or chlorine; —C₁—C₂— is —CH₂—CH₂—; C₆—C₇— is

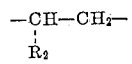

in which R₂ has the full significance hereinbefore defined and X is β-hydroxymethylene or carbonyl can be prepared from the corresponding compounds in which X is β-hydroxymethylene and Y is hydrogen using the conventional procedure for the introduction of a 9α-fluoro substituent, namely, by reacting the appropriate 11β-hydroxy compound with an N-haloamide or N-haloimide and anhydrous sulfur dioxide using the procedure described in U.S. Patent 3,005,834, treating the corresponding 9(11)-compound so obtained with N-bromoacetamide and perchloric acid or the like followed by treatment with potassium acetate in acetone to form the corresponding 9β,11β-oxido compound and reacting the latter compound with hydrogen fluoride or hydrogen chloride under anhydrous or aqueous conditions to form the desired 9α-fluoro-11β-hydroxy and 9α-chloro-11β-hydroxy compounds. The 9α-fluoro-11β-hydroxy and 9α-chloro-11β-hydroxy compounds can be oxidized, for example, using chromic acid, sodium dichromate, and like oxidizing agents, to obtain the corresponding 11-oxo compounds.

The compounds (III) wherein —C₁—C₂— is

—CH=CH— are prepared from the corresponding compounds in which —C₁—C₂— is —CH₂—CH₂— by subjecting the latter compounds to 1-dehydrogenation. The 1-dehydrogenation can be effected microbiologically using a 1-dehydrogenating microorganism, for example, of the genus Septomyxa using procedures such as that described in U.S. Patent 2,897,218, or it can be effected chemically, for example, by treatment with selenium dioxide using procedures such as that described by Meystre et al., Helv. Chim. Acta, 39, 734 (1956), or that described in British Patent Specification No. 864,414, or it can be effected with 2,3-dichloro-5,6-dicyano-1,4-benzoquinone as described in U.S. Patent 3,023,206.

The compounds (III) wherein —C₆—C₇— is

in which R₂ has the meaning hereinbefore defined are prepared from the corresponding compounds in which —C₆—C₇— is

in which R₂ has full significance hereinbefore defined by subjecting the latter compounds to 6-dehydrogenation with chloranil in accordance with the procedure of U.S. Patent 2,891,079.

The starting compounds (IV) wherein Z is a hydroxymethylene or acyloxymethylene radical are prepared from the corresponding 17α-hydroxy compounds using the procedure described in British Patent 866,730 for the preparation of 3β,21-diacetoxy-5α-pregn-16-en-11,20-dione. These latter compounds can also be converted to the corresponding 11α- and 11β-hydroxy compounds using conventional procedures, for example, by conversion to the 20-ketal followed by (a) reduction of the latter using sodium in a lower alkanol according to the procedure described in U.S. Patent 2,751,379, followed by hydrolysis of the resulting 11α-hydroxy 20-ketal or (b) reduction of the 20-ketal using lithium aluminum hydride to give the corresponding 11β,21-dihydroxy 20-ketal which is then hydrolyzed to remove the ketal group giving the desired compound. The 3- and/or 21-acyloxy groups when present are removed during the reduction step. If desired the compounds can be reacylated in accordance with methods known in the art, e.g., hydrocortisone to hydrocortisone acylates, to give the corresponding 3,21-diacylates, wherein the acyl radical has the meaning hereinbefore given.

The compounds of Formula IV wherein Z is carbonyl can be prepared from the corresponding compounds of Formula IV wherein Z is a hydroxymethylene or acyloxymethylene radical by subjecting the latter compounds to an Oppenaur Oxidation in accordance with procedures well known in the art. For example, see Djerassi, Steroid Reactions, 1963, pages 92–95, Holden-Day, Inc., San Francisco.

Alternatively the Δ¹⁶-starting steroids of this invention as represented by Formulae (III) and (IV), above, can be prepared directly from the corresponding Δ¹⁷⁽²⁰⁾ olefins as shown by the following flow sheet of partial structural formulae:

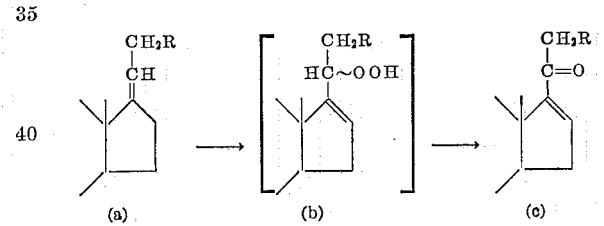

wherein R has the meaning hereinbefore defined.

As indicated by the above reaction scheme, the compounds (c) can be prepared directly from the corresponding olefins (a) in a "one-pot" process by photosensitized oxygenation of (a) to obtain the Δ¹⁶-20-hydroperoxides (b) which are then dehydrated with a suitable dehydrating agent. The olefins (a) are prepared from the corresponding cis Favorskii esters by employing the procedures set forth in U.S. Patent 2,781,343, namely, by reduction with lithium aluminum hydride. The cis Favorskii esters are in turn prepared from the corresponding 20-oxopregnanes in the manner disclosed in U.S. Patent 2,790,814. The 21-desoxy compounds (a), wherein R is hydrogen, are prepared by reduction of the corresponding 21-acylates (a), wherein R is acyloxy as hereinbefore defined, using lithium and liquid ammonium in accordance with methods known in the art.

In carrying out the photosensitized oxygenation of (a) to (b), the starting material (a) is taken up in an organic solvent, such as pyridine or dimethylformamide, and a photosensitizer such as hematoporphyrin is added. The reaction mixture is then exposed to a light source, such as a fluorescent lamp, while oxygen is bubbled through the reaction mixture at a temperature of about 25°–40° C. The intermediate hydroperoxide (b) is then converted to the corresponding Δ¹⁶-20-ketone (c). The dehydration can be effected using an acid anhydride or chloride, such as acetic anhydride. The dehydrating agent can be added directly to the reaction mixture. The use of an acylating agent results in dehydration of the peroxide and concomitant acylation of the 21-hydroxy group when present.

The process of this invention can be presented schematically as follows:

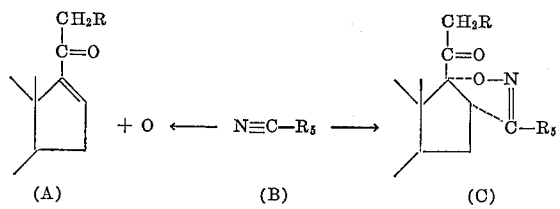

wherein R has the meaning hereinbefore defined and $R_5$ is hydrogen, lower-alkyl of 1 to 8 carbon atoms, inclusive, aryl of 6 to 12 carbon atoms, inclusive, halogen or carbalkoxy in which the alkyl radical is lower-alkyl as hereinbefore defined.

The process of this invention, in its broadest aspect, is applicable to $\Delta^{16}$-20-oxo steroids of the pregnane series having in ring D the configuration represented by (a), above.

The process of this invention comprises reacting a $\Delta^{16}$-20-oxo steroid (A) with a nitrile oxide (B) to obtain the corresponding [16,17-d]-2'-isoxazolines (C).

In the process of this invention a $\Delta^{16}$-20-oxo steroid (A) for example the compounds of Formulae III and IV, above, in a suitable solvent or combination of solvents such as ethyl ether, tetrahydrofuran, benzene, toluene, methylene chloride, combinations thereof, and the like, is reacted with a nitrile oxide (B) to obtain the corresponding [16,17-d]-2-isoxazoline (C) such as those represented for Formulae I and II, above. The products thus obtained can be separated from the reaction mixture by conventional methods such as chromatography and/or crystallization from a suitable solvent. The reaction can be carried out within a temperature range of from about —80° C. to the boiling point of the reaction mixture; a temperature range of from 0 to 30° C. is conveniently employed. A reaction time of from about 1 to 24 hours is usually sufficient for completion of the reaction depending in part on the temperature at which the reaction is carried out. The nitrile oxides (B) are in general unstable compounds and are advantageously added to the steroidal starting material as freshly prepared solutions or they can be conveniently and advantageously generated in situ.

The nitrile oxides (B) wherein $R_5$ is aryl, carbalkoxy or chlorine are prepared from the corresponding hydroxamoyl chlorides of the formula:

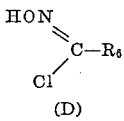

(D)

wherein $R_6$ is aryl, carbalkoxy or chlorine, by treatment with a base. Bases which are advantageously employed are tertiary amines, such as triethylamine, tributylamine and the like. Other bases such as tetrabutylammonium hydroxides and strongly basic ion exchange resins can also be used. When these nitrile oxides are freshly prepared as separate solutions rather than in situ, the reaction is carried out in the presence of a suitable organic solvent such as those solvents hereinbefore listed in the immediately preceding paragraph. These nitrile oxides when prepared as separate solutions, can also be obtained from the corresponding hydroxamoyl chlorides, using aqueous bases such as sodium hydroxide, potassium hydroxide, sodium carbonate and the like. Water immiscible organic solvents, such as benzene, ether, toluene, methylene chloride and the like are used with the aqueous bases so that the nitrile oxide, which is contained in the organic solvent, can be easily separated from the aqueous layer. The nitrile oxide solution is then dried over a drying agent such as sodium sulfate, prior to addition to the steroid starting material.

The nitrile oxides (B), wherein $R_5$ is lower-alkyl, can be obtained as freshly prepared solutions in an organic solvent such as ethyl ether, benzene, toluene, tetrahydrofuran, methylene chloride, combinations thereof and the like, or they can be generated in situ by reacting a lower-alkyl nitro compound of the formula:

$$R_4\text{---}CH_2\text{---}NO_2$$

(E)

wherein $R_4$ is lower-alkyl as hereinbefore defined, with two or more molar equivalents of phenylisocyanate or other arylisocyanates) in the presence of a catalytic amount of a tertiary amine, such as triethylamine to obtain the corresponding lower-alkyl substituted nitrile oxides (B). In this procedure the corresponding diarylureas are obtained as by-products. It is advantageous, therefore, to employ a solvent in which the diarylurea is insoluble so that it can be readily removed from the nitrile oxide solution or from the steroid reaction mixture by filtration.

The hydroxamoyl chlorides (D), many of which are known in the art, can be prepared in accordance with known methods. For example, the hydroxamic acids (D), wherein $R_6$ is aryl can be prepared by chlorination of an oxime of an aryl aldehyde as disclosed by Werner et al., Ber., 27, 2193 (1894) or H. Reinboldt, Ann., 451, 161 (1927). The hydroxamoyl chlorides (D) wherein $R_6$ is chlorine is a known compound, see for example, E. Grysykiewicz-Trochimowski et al., Bull. Soc. Chem., 15, 597 (1948). The hydroxamoyl chlorides (D) wherein $R_6$ is carbalkoxy can be prepared in accordance with the method disclosed by G. Skinner, J. Am. Chem. Soc., 46, 731 (1924).

The [16,17-d]-2'-isoxazolines of this invention wherein $R_1$ is carbalkoxy and carboxy are also useful as intermediates in a new and novel method for preparing known and useful 16α-cyano-17α-hydroxy steroids of the pregnane series.

The conversion of the 3'-carbalkoxy-[16,17-d]-2'-isoxazolines to the corresponding 16α-cyano-17α-hydroxy compounds can be presented schematically as follows:

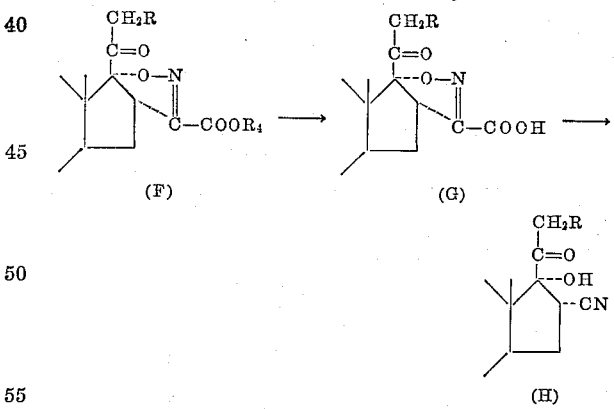

wherein R and $R_4$ have the meanings hereinbefore defined. The 16α-cyano-17α-hydroxy compounds (H) are prepared by hydrolyzing a 3'-carbalkoxy-[16,17-d]-2'-isoxazoline (F) with an aqueous inorganic base, for example, alkali metal bases, such as sodium hydroxide, potassium hydroxide, sodium carbonate, potassium carbonate, sodium bicarbonate and the like to produce the corresponding 3'-carboxy-[16,17-d]-2'-isoxazoline (G). The reaction is preferably carried out in an inert atmosphere, e.g., nitrogen, in an organic solvent such as acetone, dioxane, tetrahydrofuran, lower-alkanols, such as methanol, ethanol, isopropanol, tert.-butanol, and the like. The hydrolysis can be carried out within a temperature range of about 0° C. to the boiling point of the reaction mixture. A temperature of about 20° C. to 40° C. is generally preferred. The time required for completion of the hydrolysis reaction depends upon the temperature at which the reaction is carried out. A time of from 1 to 48 hours is generally sufficient with the preferred temperature range. The 3'-carboxy-[16,17-d]-2'-isoxazolines (G), thus obtained, are then subjected to pyrolytic decarboxylation to produce the corresponding 16α-cyano-17α-hydroxy compounds (H). The pyrolytic decarboxylation is carried out by heating the solid product (G) to a temperature above its melting point, or preferably, the pyrolytic decarboxylation is carried out in a high boiling non-reactive organic solvent, such as xylene, toluene, mono- and dichlorobenzenes, ethyl and tri-methyl benzenes, diphenyl ether, and the like. The pyrolysis is carried out at a temperature above 100° C. up to the boiling point of the solvent employed. The time required for completion of the decarboxylation reaction can vary from a few minutes to several hours depending on the conditions employed. When the reaction is carried out in an organic solvent a period of from about 1 to 4 hours is usually sufficient for completion of the reaction. When an organic solvent is used, it is advantageous to carry out the reaction in the presence of a high boiling amine, such as an aromatic or aliphatic amine, for example, collidine, pyridine, trialkylamines, e.g., tri-N-butylamine, and the like.

The following examples are illustrative of the process and products of this invention but are not to be construed as limiting.

EXAMPLE 1

*3'-methyl-11β,21-dihydroxy-3,20-dioxo-1,4-pregnadieno-[16,17-d]-2'-isoxazoline 21-acetate*

To a solution of 0.384 g. of 11β,21-dihydroxy-1,4,16-pregnatriene-3,20-dione 21-acetate and 0.43 ml. of phenylisocyanate in a mixture of 10 ml. of benzene and 5 ml. of tetrahydrofuran was added 2 ml. of benzene solution containing 0.143 ml. of nitroethane and 0.04 ml. of triethylamine. The reaction mixture was allowed to stand 22 hours at 25° C., was then filtered and the filtrate evaporated to give 3'-methyl-11β,21-dihydroxy-3,20-dioxo-1,4-pregnadieno-[16,17-d] - 2' - isoxazoline 21-acetate, M.P. 247–250° C. after crystallization from acetone-Skellysolve B.

*Analysis.*—Calcd. for $C_{25}H_{31}NO_6$: C, 68.00; H, 7.08; N, 3.17. Found: C, 67.99; H, 7.14; N, 2.99.

EXAMPLE 2

*3',6α-dimethyl-9α-fluoro-11β,21-dihydroxy-3,20-dioxo-4-pregneno-[16,17-d]-2'-isoxazoline 21-acetate*

A 0.414 g. sample of 6α-methyl-9α-fluoro-11β,21-dihydroxy-pregna - 4,16 - diene-3,20-dione 21-acetate was treated in the same manner as described in Example 1, except the reaction was terminated after 5 hours. Considerable starting material remained so that the reaction was repeated as before with a reaction time of 22 hours. The mixture was filtered, the filter cake (0.60 g.) triturated with 12 ml. of methylene dichloride and refiltered. The soluble fraction (0.22 g.) was combined with solids (0.33) from the original filtration and crystallized twice from acetone-Skellysolve B to give 0.23 g. of 3',6α-dimethyl-9α-fluoro-11β,21 - dihydroxy-3,20 - dioxo-4-pregneno - [16,17 - d] - 2' - isoxazoline 21 - acetate, M.P. 232–236° C.

*Analysis.*—Calcd. for $C_{26}H_{34}FNO_6$: C, 65.66; H, 7.21; F, 3.99; N, 2.95. Found: C, 65.62; H, 7.52; F, 4.34; N, 2.93.

EXAMPLE 3

*3',6β-dimethyl-5α,11β-trihydroxy - 3,20 - dioxopregnano-[16,17-d]-2' - isoxazoline 3 - [β,β-dimethylpropylene-α,γ-diol]-ketal 21-acetate*

A solution of 0.505 g. of 6β-methyl-5α,11β,21-trihydroxypregn-16-ene 3,20-dione 3 - [β,β - dimethylpropylene-α,γ-diol]-ketal 21-acetate in 5 ml. of benzene was allowed to react with phenylisocyanate, nitroethane and triethylamine catalyst in the same manner as described in Example 1. The crude product was chromatographed over 75 g. of Florisil (synthetic magnesium silicate, hereinafter referred to as Florisil) to give a major peak eluted with 20% acetone-80% Skellysolve B (hexanes, hereinafter referred to as Skellysolve B). Crystallization from acetone-Skellysolve B gave 0.390 g. of 3',6β-dimethyl-5α,11β,21-trihydroxy-3,20 - dioxopregnano-[16,17-d]-2'-isoxazoline 3-[β,β-dimethylpropylene-α,γ-diol]-ketal 21-acetate, M.P. 201–205° C., $\mu_{max}^{CH_2CH_2}$ 3550, 3400, 1755, 1740, 1235 cm.$^{-1}$

EXAMPLE 4

*3',6β-dimethyl-5α,11β,21-trihydroxy-3,20-dioxopregnano-[16,17-d]-2'-isoxazoline 21-acetate*

A solution of 120 mg. of 3',6β-dimethyl-5α,11β,21-trihydroxy-3,20-dioxopregnano-[16,17-d] - 2'-isoxazoline 3-[β,β-dimethylpropylene-α-γ-diol]-ketal 21-acetate in 8.5 ml. of acetone is treated with 1.5 ml. of 1 N sulfuric acid and the solution is gently boiled on the steam bath for about 10 minutes. The volume is then reduced to about one-half by evaporation and the solution is cooled, diluted with about 25 ml. of water, concentrated under reduced pressure to remove the acetone, and cooled in an ice bath. The resulting solid product is collected on a filter and dried to give 3',6β-dimethyl-5α,11β,21-trihydroxy-3,20-dioxopregnano - [16,17-d] - 2'-isoxazoline 21-acetate.

EXAMPLE 5

*3'-methyl-3β-hydroxy-20-oxo-5-pregneno-[16,17-d]-2'-isoxazoline 3-acetate*

A solution of 3.0 g. of 16-dehydropregnenolone acetate and 4.3 ml. of phenyl isocyanate in 30 ml. of tetrahydrofuran and 60 ml. of benzene was cooled in an ice bath and stirred while a solution of 1.43 ml. of nitroethane and 0.33 ml. of triethylamine in 16 ml. of benzene was added slowly. The mixture was allowed to stand 22 hours at 25° C., was filtered and the filtrate evaporated in vacuo to 4.8 g. of solid which was triturated with 97 ml. of methylene chloride. The soluble fraction was crystallized from acetone-Skellysolve B to give 2.22 g. of 3'-methyl-3β-hydroxy-20-oxo-5-pregneno-[16,17-d] - 2'-isoxazoline 3-acetate, M.P. 237–240° C.

*Analysis.*—Calcd. for $C_{25}H_{35}NO_4$: C, 72.60; H, 8.53; N, 3.39. Found: C, 72.33; H, 8.63; N, 3.59.

EXAMPLE 6

*3',6α-dimethyl-3,20-dioxo-4-pregneno-[16,17-d]-2'-isoxazoline*

To a solution of 4.0 g. (12.28 moles) of 6α-methylpregna-4,16-diene-3,20-dione and 2.67 ml. (24.56 moles) of phenylisocyanate in 100 ml. of benzene and 50 ml. of tetrahydrofuran was added a solution of 0.88 ml. (12.3 moles) of nitroethane and 0.2 ml. of triethylamine in 10 ml. of benzene. The mixture was allowed to stand overnight at about 25° C. and was filtered. A portion of the filtrate (¼) was removed and evaporated. The remaining solution was retreated with proportionate amounts of phenylisocyanate and nitromethane as above. The procedure was repeated twice more removing successively aliquots of ⅓ and ½ of the filtrate volume.

Each of the aliquots (which should contain about 1 g. of steroid) were chromatographed on Florisil (100 g.). In each case a peak of several components was eluted with 12–18% acetone-Skellysolve B. Rechromatography of the peak fractions on silica gel and elution with cyclohexane-ethyl acetate gave oils which were examined by thin layer chromatography. Appropriate fractions were crystallized from ether to give 1.2 g. of 3',6α-dimethyl-3,20-dioxo - 4 - pregneno-[16,17-d]-2'-isoxazoline, M.P. 141–144° C. An analytical sample recrystallized from ether melted at 143–145° C.

*Analysis.*—Calcd. for $C_{24}H_{33}NO_3$: C, 75.16; H, 8.67; N, 3.65. Found: C, 75.17; H, 8.67; N, 3.44.

EXAMPLE 7

*3'-methyl-6α-fluoro-11β,21-dihydroxy-3,20-dioxo-4-pregneno-[16,17-d]-2'-isoxazoline*

A solution of 4.3 ml. phenyl isocyanate in about 100 ml. of benzene is cooled in an ice bath and stirred while adding a solution of 1.43 ml. of nitroethane and 0.33 ml. of triethylamine in 16 ml. of benzene. The solution is kept cold, filtered and added to a solution of 4.0 g. of 6α-fluoro-11β,21 - dihydroxy-4,16-pregnadiene-3,20-dione in 30 ml. of tetrahydrofuran and 60 ml. of benzene. This reaction mixture is allowed to stand about 24 hours at about 25° C., is filtered and the filtrate evaporated to remove the solvent. The crude product thus obtained is chromatographed on 75 g. of Florisil and the column is eluted with Skellysolve B containing increasing proportions of acetone. Those fractions which contain the desired product as determined by thin layer chromatography are combined and crystallized from acetone-Skellysolve B to give 3'-methyl-6α-fluoro-11β,21-dihydroxy-3,20-dioxo-4-pregneno-[16,17-d]-2'-isoxazoline.

EXAMPLE 8

*3'-ethyl-6α-chloro-21-hydroxy-3,11,20-trioxo-4-pregneno-[16,17-a]-2'-isoxazole 21-benzoate*

To a solution of 10 millimoles of 6α-chloro-21-hydroxy-4,16-pregnadiene-3,11,20-trione 21-benzoate and 20 millimoles of phenylisocyanate in about 100 ml. of benzene and 50 ml. of tetrahydrofuran is added a solution of 10 millimoles of nitropropane and 0.2 ml. of triethylamine in 10 ml. of benzene. The reaction mixture is allowed to stand at about 25° C. for approximately 24 hours and is then filtered and the filtrate is evaporated to remove the solvent. The crude product thus obtained is chromatographed on 75 g. of Florisil and the column is eluted with Skellysolve B containing increasing proportions of acetone. Those fractions which contain the desired product as determined by thin layer chromatography are combined and crystallized from acetone-Skellysolve B to give 3'-ethyl-6α-chloro-21-hydroxy-3,11,20-trioxo-4-pregneno-[16,17-d]-2'-isoxazoline 21-benzoate.

EXAMPLE 9

*3'-propyl-3β-11β-dihydroxy-20-oxo-5α-pregnano-[16,17-d]-2'-isoxazoline*

To a solution of 10 millimoles of 3β,11β-dihydroxy-5α-pregn-16-ene-20-one and 20 millimoles of phenylisocyanate in about 100 ml. of benzene and 50 ml. of tetrahydrofuran is added a solution of 10 millimoles of n-nitrobutane and 0.2 ml. of triethylamine in 10 ml. of benzene. The reaction mixture is alowed to stand at about 25° C. for aprproximately 24 hours and is then filtered and the filtrate is evaporated to remove the solvent. The crude product thus obtained is chromatographed on 75 g. of Florisil and the column is eluted with Skellysolve B containing increasing proportions of acetone. Those fractions which contain the desired product as determined by thin layer chromatography are combined and crystallized from acetone-Skellysolve B to give 3'-propyl-3β,11β-dihydroxy-20-oxo-5α-pregnano-[16,17-d]-2'-isoxazoline.

EXAMPLE 10

*3'-methyl-11β,21-dihydroxy-3,20-dioxo-1,4,6-pregnatrieno-[16,17-d]-2'-isoxazoline*

To a solution of 10 milimoles of 11β,21-dihydroxy-pregna-1,4,6,16-tetraene-3,20-dione and 20 millimoles of phenylisocyanate in about 100 ml. of benzene and 50 ml. of tetrahydrofuran is added a solution of 10 millimoles of nitroethane and 0.2 ml. of triethylamine in 10 ml. of benzene. The reaction mixture is allowed to stand at about 25° C. for approximately 24 hours and is then filtered and the filtrate is evaporated to remove the solvent. The crude product thus obtained is chromatographed on 75 g. of Florisil and the column is eluted with Skellysolve B containing increasing proportions of acetone. Those fractions which contain the desired product as determined by thin layer chromatography are combined and crystallized from acetone-Skellysolve B to give 3'-methyl-11β,21-dihydroxy-3,20-dioxo-1,4,6-pregnatrieno-[16,17-d] - 2' - isoxazoline.

EXAMPLE 11

*3'-n-butyl-3β-hydroxy-6-methyl-20-oxo-5-pregneno-[16,17-d]-2-isoxazoline*

To a solution of 10 millimoles of 3β-hydroxy-6-methyl-20-oxopregn-5,16-diene and 20 millimoles of phenylisocyanate in about 100 ml. of benzene and 50 ml. of tetrahydrofuran is added a solution of 10 millimoles of n-nitropentane and 0.2 ml. of triethylamine in 10 ml. of benzene. The reaction mixture is allowed to stand at about 25° C. for approximately 24 hours and is then filtered and the filtrate is evaporated to remove the solvent. The crude product thus obtained is chromatographed on 75 g. of Florisil and the column is eluted with Skellysolve B containing increasing proportions of acetone. Those fractions which contain the desired product as determined by thin layer chromatography are combined and crystallized from acetone-Skellysolve B to give 3'-n-butyl-3β-hydroxy-6-methyl-20-oxo-5-pregneno-[16,17-d]-2'-isoxazoline.

EXAMPLE 12

*3'-methyl-9α-fluoro-11β,21-dihydroxy-3,20-dioxo-1,4-pregnadieno-[16-17-d]-2'-isoxazoline 21-acetate*

A solution of 3.0 g. of 9α-fluoro-11β,21-dihydroxypregna-1,4,16-triene-3,20-dione 21-acetate and 4.3 ml. of phenyl isocyanate in 50 ml. of tetrahydrofuran and 100 ml. of benzene was cooled and stirred in an ice bath while a solution of 1.43 ml. of nitroethane and 0.33 ml. of triethylamine in 16 ml. of benzene was added slowly. The mixture was allowed to warm to 25° C. and stand for 22 hours. A solid was separated by filtration and the filtrate was evaporated to give a residue. The residue was crystallized from acetone-Skellysolve B and gave two crops of diphenylurea. The mother liquors were evaporated to give a residue (1.35 g.) which was extracted with methylene chloride. The methylene chloride extract was evaporated to give a residue (1.08 g.) which was chromatographed on 250 g. of Florisil. A peak fraction (0.45 g.) eluted with 30% acetone-Skellysolve B was crystallized from the same solvent pair to give 3'-methyl-9α-fluoro-11β,21-dihydroxy-3,20-dioxo-1,4 - pregnadieno-[16,17-d]-2'-isoxazoline 21-acetate, M.P. 214–217° C.

*Analysis.*—Calcd. for $C_{25}H_{30}FNO_6$: C, 65.34; H, 6.58; F, 4.13; N, 3.05. Found: C, 65.74; H, 7.11; F, 3.98; N, 3.04.

EXAMPLE 13

*3'-phenyl-11β-21-dihydroxy-3,20-dioxo-1,4-pregnadieno-[16,17-d]-2'-isoxazoline 21-acetate*

A solution of 3.84 g. of 11β,21-dihydroxypregna-1,4,16-triene-3,20-dione 21-acetate and 1.70 g. of benzohydroxamoyl chloride in a mixture of 100 ml. of tetrahydrofuran and 100 ml. of ethyl ether was cooled and stirred in an ice bath while a solution of 1.52 ml. of triethylamine in 15 ml. of ether was added dropwise. The mixture was then allowed to warm to 25° C. and stand for 16 hours. The solids were collected and the filtrate evaporated an oil which was chromatographed over 500 g. of Florisil. The peak fraction eluted with 40% to 50% acetone-Skellysolve B was principally 3'-phenyl-11β,21-dihydroxy-3,20-dioxo-1,4-pregnadieno-[16,17-d]-2' - isoxazoline 21-acetate as an amorphous solid. Rechromatography over silica gel (1:1 cyclohexane:ethyl acetate) the product as an amorphous solid, homogeneous by thin layer chromatography.

*Analysis.*—Calcd. for $C_{30}H_{33}NO_6$: C, 71.55; H, 6.61; N, 2.78. Found: C, 70.81; H, 6.85; N, 2.91.

EXAMPLE 14

*6α-methyl-3'-phenyl-3,20-dioxo-4-pregneno-[16,17-d]-2'-isoxazoline*

A solution of 9.78 g. of 6α-methylpregna-4,16-diene-3,20-dione and 5 g. of benzohydroxamoyl chloride in 150 ml. of tetrahydrofuran and 100 ml. of ether was cooled in an ice bath while 4.5 ml. of triethylamine in 50 ml. of ether was added slowly with stirring. The mixture was filtered and the filtrate evaporated and crystallized successively from ethyl ether Skellysolve B and ethyl ether to give 6α-methyl-3'-phenyl-3,20-dioxo-4-pregneno-[16,17-d]-2'-isoxazoline, M.P. 140–161° C. containing 3.4% ethyl ether of solution.

*Analysis.*—Calcd. for $C_{29}H_{35}NO_3$: C, 78.17; H, 7.92; N, 3.14. Found [1]: C, 77.83; H, 7.94; N, 3.03.

EXAMPLE 15

*3'-phenyl-3β-hydroxy-20-oxo-5-pregneno-[16,17-d]-2'-isoxazoline 3-acetate*

A solution of 3.56 g. of 16-dehydropregnenolone acetate and 1.6 g. of benzohydroxamoyl chloride in 100 ml. of tetrahydrofuran and 100 ml. of ethyl ether was cooled and stirred in an ice bath while 1.4 ml. of triethylamine in 60 ml. of ether was added dropwise. The mixture was allowed to warm to 25° C. and stand for 16 hours. The solids were collected and the filtrate evaporated to a foam which was crystallized successively from aqueous acetone, acetone and acetone-Skellysolve B to give 3'-phenyl-3β-hydroxy-20-oxo-5-pregneno-[16,17-d]-2'-isoxazoline 3-acetate, M.P. 204–211° C.

*Analysis.*—Calcd. for $C_{30}H_{37}NO_4$: C, 75.76; H, 7.84; N, 2.95. Found: C, 75.24; H, 7.47; N, 2.95.

EXAMPLE 16

*3'-(4-pyridyl)-11β,21-dihydroxy-3,20-dioxo-1,4-pregnadieno-[16,17-d]-2'-isoxazoline 21-acetate*

To a solution of 3.84 g. of 11β,21-dihydroxypregna-1,4,16-triene-3,20-dione 21-acetate in 100 ml. of tetrahydrofuran and 100 ml. of ethyl ether is added a cold ethereal solution of 4-pyridylnitrile oxide. The nitrile oxide solution is prepared by adding 60 ml. of 1 N aqueous sodium hydroxide to a stirred mixture of 5.79 g. of isonicotinohydroxamoyl chloride hydrochloride and 100 ml. of ethyl ether cooled in an ice bath. The ether layer containing 4-pyridylnitrile oxide is separated, dried briefly over magnesium sulfate and added to the steroidal solution. The resultant mixture is allowed to stand 16 hours at about 25° C., the solvent is evaporated and the residue is chromatographed over a column of Florisil and the column is eluted with Skellysolve B containing increasing proportions of acetone. The fractions which contain the desired product as determined by thin layer chromatography are combined and crystallized from acetone-Skellysolve B to give 3'-(4-pyridyl)-11β,21-dihydroxy-3,20-dioxo-1,4-pregnadieno-[16,17-d]-2'-isoxazoline 21-acetate.

EXAMPLE 17

*3'-p-tolyl-11β,21-dihydroxy-3,20-dioxo-4-pregneno-[16,17-d]-2'-isoxazoline*

A solution of 4.0 g. of 11β,21-dihydroxypregna-4,16-diene-3,20-dione and 3.5 g. of p-toluohydroxamoyl chloride in a mixture of 100 ml. of tetrahydrofuran and 100 ml. of ethyl ether is cooled and stirred in an ice bath while a solution of 2.8 ml. of triethylamine in 60 ml. of ether is added dropwise. The mixture is then allowed to warm to about 25° C. and stand until the reaction is complete. The reaction mixture is then filtered and the filtrate evaporated to remove the solvent. The residual product thus obtained is chromatographed over a column of Florisil and the column is eluted with Skellysolve B containing increasing proportions of acetone. Those fractions which contain the desired product as determined by thin layer chromatography are combined and crystallized from acetone-Skellysolve B to give 3'-p-tolyl-11β,21-dihydroxy-3,20-dioxo-4-pregneno-[16,17-d]-2'-isoxazoline.

EXAMPLE 18

*3'-p-nitrophenyl-3β,21-dihydroxy-20-oxo-5α-pregnano-[16,17-d]-2'-isoxazoline*

A solution of 4.0 g. of 3β,21-dihydroxy-5α-pregn-16-ene-20-one and 3.5 g. of p-nitrophenylhydroxamoyl chloride in a mixture of 100 ml. of tetrahydrofuran and 100 ml. of ethyl ether is cooled and stirred in an ice bath while a solution of 3 ml. of triethylamine in 60 ml. of ether is added dropwise. The mixture is then allowed to warm to about 25° C. and stand until the reaction is complete. The product is recovered from the reaction mixture and purified in the same manner as disclosed in Example 13, above, to obtain 3'-p-nitrophenyl-3β,21-dihydroxy-20-oxo-5α-pregnano-[16,17-d]-2'-isoxazoline.

EXAMPLE 19

*3'-p-fluorophenyl-6α-methyl-3,20-dioxo-4-pregneno-[16,17-d]-2'-isoxazoline*

A mixture of 3.5 g. of p-fluorophenylhydroxamoyl chloride in 50 ml. of tetrahydrofuran and 50 ml. of ethyl ether is cooled and stirred in an ice bath while a solution of 3.0 ml. of triethylamine in 60 ml. of ether is added dropwise. The reaction mixture is kept cold, filtered and the filtrate added to a solution of 4.0 g. of 6α-methylpregna-4,16-diene-3,20-dione in about 50 ml. of tetrahydrofuran and 50 ml. of ethyl ether. The reaction mixture is allowed to warm to about 25° C. and stand until the reaction is complete. The product is recovered from the reaction mixture and purified in the manner disclosed in Example 13, above, to obtain 3'-p-fluorophenyl-6α-methyl-3,20-dioxo-4-pregneno-[16,17-d]-2'-isoxazoline.

EXAMPLE 20

*3'-chloro-11β,21-dihydroxy-3,20-dioxo-1,4-pregnadieno-[16,17-d]-2'-isoxazoline 21-acetate*

To a solution of 3.84 g. of 11β,21-dihydroxy-1,4,16-pregnatriene-3,20-dione 21-acetate in 75 ml. of tetrahydrofuran containing 3.15 g. of dichloroformoxime [E. Grysykiewicz-Trochimowski et al., Bull. Soc. Chim., 15, 597 (1948)] and 75 ml. of ether was added a solution of 4.15 ml. of triethylamine in 60 ml. of ether dropwise with stirring. The mixture was allowed to stand overnight at room temperature, was then filtered and the filtrate evaporated. The residue thus obtained was chromatographed on Florisil (250 g.) and the fractions examined by thin layer chromatography. A fraction (0.4 g.) slightly less polar than the starting material was crystallized from acetone-Skellysolve B to give 0.235 g. of 3'-chloro-11β,21-dihydroxy-3,20-dioxo-1,4-pregnadieno-[16,17-d]-2'-isoxazoline 21-acetate, M.P. 242–245° C.

*Analysis.*—Calcd. for $C_{24}H_{28}ClNO_6$: Cl, 7.68; N, 3.03. Found: Cl, 7.62; N, 3.16.

In the same manner substituting other compounds of Formulae III and IV above as starting material in Example 16 is productive of the corresponding 3'-chloro-[16,17-d]-2'-isoxazolines of Formulae I and II, respectively.

EXAMPLE 21

*3'-carbethoxy-11β,21-dihydroxy-3,20-dioxo-1,4-pregnadieno-[16,17-d]-2'-isoxazoline 21-acetate*

To a solution of 3.84 g. of 11β,21-dihydroxypregna-1,4-16-triene-3,20-dione 21-acetate and 1.52 g. of ethyl chloroximino acetate in 100 ml. of tetrahydrofuran and 100 ml. of ethyl ether was added dropwise a solution of 1.4 ml. of triethylamine in 20 ml. of ether. After 2 hours at 25° C., an additional 3.04 g. of ethyl chloroximino acetate was added followed by addition of 2.8 ml. of triethylamine in 40 ml. of ether. The reaction mixture was allowed to stand 1 hour more, was filtered, the filtrate evaporated to dryness and crystallized from acetone-Skellysolve B to ---
[1] Corrected for solvation.

give 3.17 g. of solvated 3'-carbethoxy-11β,21-dihydroxy-3,20 - dioxo-1,4-pregnadieno-[16,17-d]-2'-isoxazoline 21-acetate, M.P. 209–213° C. Crystallizations from acetone and ethanol gave an analytical sample, M.P. 212–215° C.

Analysis.—Calcd. for $C_{28}H_{33}NO_8$: C, 64.91; H, 6.66; N, 2.80. Found: C, 64.69; H, 6.83; N, 3.01.

EXAMPLE 22

3'-carbethoxy-3β-hydroxy-20-oxo-5-pregneno-[16,17-d]-2'-isoxazoline 3-acetate

A solution of 10.7 g. of 16-dehydropregnenolone acetate and 5.0 g. of ethyl chloroximino acetate in 150 ml. of tetrahydrofuran and 150 ml. of ether was cooled in an ice bath and a solution of 4.6 ml. of triethylamine in 30 ml. of ether was added dropwise. After ½ hour additional ethyl chloroximino acetate (5.0 g.) and triethylamine (4.6 ml.) in 30 ml. of ether was added; the mixture was allowed to warm to 25° C., and stand for 16 hours. The mixture was then filtered, the filtrate evaporated to dryness and then chromatographed on Florisil (500 g.). Elution with 12 to 16% acetone-Skellysolve B gave 7.3 g. of product which was crystallized twice from acetone-Skellysolve B to give 5.2 g. of 3'-carbethoxy-3β-hydroxy-20 - oxo - 5-pregneno-[16,17-d]-2'-isoxazoline 3-acetate, M.P. 167–170° C.

Analysis.—Calcd. for $C_{27}H_{37}NO_6$: C, 68.76; H, 7.91; N, 2.97. Found: C, 68.77; H, 8.02; N, 3.18.

EXAMPLE 23

3'-carbethoxy-3β-hydroxy-20-oxo-5β-pregnano-[16,17-d]-2'-isoxazoline 3-acetate

To a solution of 10.74 g. of 3β-hydroxy-5β-pregn-16-en-20-one 3-acetate and 4.55 g. of ethyl chloroximino acetate in 100 ml. of tetrahydrofuran and 100 ml. of ether was added a solution of 4.2 ml. of triethylamine in 25 ml. of ether. After 1 hour a second addition of 4.55 g. of ethyl chloroximino acetate was made followed by addition of 4.2 ml. of triethylamine in ether as before. After an additional 1.5 hours, a third addition of ethyl chloroximino acetate (4.55 g.) and triethylamine (4.2 l.) was made. The mixture was then stirred for 1.5 hours more at 25° C., filtered and the filtrate evaporated and chromatographed on Florisil (400 g.). Elution with 10% acetone-Skellysolve B gave 13.4 g. of product which was crystallized from acetone-Skellysolve B to give 9.20 g. of 3'-carbethoxy-3β-hydroxy-20-oxo-5β-pregnano-[16,17-d]-2'-isoxazoline 3-acetate, M.P. 158–161° C. Rechromatography of the mother liquors and side fractions gave an additional 2.5 g. of 3'-carbethoxy-3β-hydroxy-20-oxo-5β-pregnano-[16,17-d]-2'-isoxazoline 3-acetate, M.P. 159–161° C.

Analysis.—Calcd. for $C_{27}H_{39}NO_6$: C, 68.47; H, 8.30; N, 2.96. Found: C, 68.68; H, 8.43.

EXAMPLE 24

6α-methyl-3'-carbethoxy-3,20-dioxo-4-pregneno-[16,17-d]-2'-isoxazoline

A solution of 9.79 g. of 6α-methylpregna-4,16-diene-3,20-dione in 100 ml. of ether and 100 ml. of tetrahydrofuran was reacted with ethyl chloroximino acetate in the same manner as disclosed in Example 19, above. The crude product thus obtained was crystallized from acetone-Skellysolve B and aqueous ethanol to give 9.5 g. of 6α - methyl-3'-carbethoxy-3,20-dioxo-4-pregneno-[16,17-d]-2'-isoxazoline, M.P. 207–209° C., an analytical sample had M.P. 210–211° C., $\nu_{max.}^{EtOH}$ 242 mμ ($\epsilon$ 20,600)

Analysis.—Calcd. for $C_{26}H_{35}NO_5$: C, 70.72; H, 7.99; N, 3.17. Found: C, 70.52; H, 8.34; N, 3.23.

EXAMPLE 25

3'-carbomethoxy-6α-fluoro-11β,21-dihydroxy-3,20-dioxo-4-pregneno-[16,17-d]-2'-isoxazoline To a solution of 10.0 g. of 6α-fluoro-11β,21-dihydroxypregn-4-ene-3,20-dione and 4.55 g. of methyl chloroximino acetate in 100 ml. of tetrahydrofuran and 100 ml. of ether is added a solution of 4.2 ml. of triethylamine in 25 ml. of ether. After 1 hour a second addition of 4.55 g. of methyl chloroximino acetate is made followed by addition of 4.2 ml. of triethylamine in ether as before. After an additional 1.5 hours, a third addition of methyl chloroximino acetate (4.55 g.) and trimethylamine (4.2 l.) is made. The mixture is then stirred for 1.5 hours more at about 25° C., filtered and the filtrate evaporated. The residue thus obtained is chromatographed on Florisil and eluted with Skellysolve B containing increasing proportions of acetone. Those fractions which contain the desired product as determined by thin layer chromatography are combined and crystallized from acetone-Skellysolve B to give 3'-carbomethoxy-6α-fluoro-11β,21-dihydroxy - 3,20-dioxo-4-pregneno-[16,17-d]-2'-isoxazoline.

EXAMPLE 26

3'-carboxy-3β-hydroxy-20-oxo-5β-pregnano-[16,17-d]-2'-isoxazoline 3-acetate

A solution of 0.63 g. (1.33 mmoles) of 3'-carbethoxy-3β - acetoxy-20-oxo-5β-pregnano-[16,17-d]-2'-isoxazoline in methanol (50 ml.) was boiled to expel oxygen and cooled to 25° C. under a nitrogen atmosphere. A nitrogen-purged solution of potassium hydroxide in 20% aqueous methanol was added (1.15 ml. of 2.29 N) and the solution was allowed to stand overnight at 25° C. Thin layer chromatographic analysis then showed absence of starting material and titration showed only 1 eq. of base had been consumed. The solution was acidified with 1 N hydrochloric acid, evaporated in vacuo, redissolved in methylene chloride, washed with brine and evaporated to 0.6 g. of colorless oil which was crystallized from ether to give 3'-carboxy-3β-hydroxy-20-oxo-5β-pregnano-[16,17-d]-2'-isoxazoline 3-acetate, M.P. 190° C.

EXAMPLE 27

3'-carboxy-11β,21-dihydroxy-3,20-dioxo-1,4-[16,17-d]-2'-isoxazoline 21-acetate

A solution of 13.3 g. of 3'-carbethoxy-11β,21-dihydroxy - 3,20 - dioxo-1,4-pregnadieno-[16,17-d]-2'-isoxazoline 21-acetate in 450 ml. of methanol and 50 ml. of tetrahydrofuran was purged with nitrogen and 45 ml. of 10% aqueous potassium carbonate was added. After 4 hours at 25° C., 4 ml. of acetic acid was added and the mixture was concentrated in vacuo, diluted with water and then freeze dried to give a tan powder containing 3' - carboxy - 11β,21-dihydroxy-3,20-dioxo-1,4-pregnadieno-[16,17-d]-2'-isoxazoline. The product thus obtained was shaken with 40 ml. of pyridine and 80 ml. of acetic anhydride for 7 hours at 25° C. and was then filtered. The filtrate was diluted to 500 ml. with ice and water to give a gummy precipitate. The supernatant was decanted, diluted with 500 ml. of saturated brine and then acidified to pH 1 with concentrated hydrochloric acid and 100 g. of solid sodium chloride was added. The mixture was stirred 2 hours and was filtered. The filter cake was washed with water and dried to give 7.1 g. of 3'-carboxy-11β,21 - hydroxy - 3,20-dioxo-1,4-pregnadieno-[16,17-d]-2'-isoxazoline 21-acetate as a white powder.

EXAMPLE 28

6α-methyl-3'-carboxy-3,20-dioxo-4-pregneno-[16,17-d]-2'-isoxazoline

A solution of 8.83 g. of 6α-methyl-3'-carbethoxy-3,20-dioxo-4-pregneno-[16,17-d]-2'-isoxazoline in 500 ml. of methanol was boiled to expel oxygen and then was cooled to 50° C. under an atmosphere of nitrogen. A solution of potassium hydroxide (1.42 g.) in 12 ml. of water-methanol (1:4) was added and the solution was allowed to stand overnight at 25° C. Following addition of 50 ml. of 1 N of hydrochloric acid, the methanol was evaporated in vacuo, the residue was diluted to 1 l. with saturated brine, the product collected, washed with water and dried to give 7.9 g. of 6α-methyl-3′-carboxy-3,20-dioxo-4-pregneno-[16,17-d]-2′-isoxazoline; an analytical sample crystallized from aqueous methanol melted at 188–189° C.

*Analysis.*—Calcd. for $C_{24}H_{31}NO_5$: C, 69.71; H, 7.56; N, 3.39. Found: C, 69.40; H, 7.48; N, 3.31.

In the same manner following the procedure of Examples 26, 27 and 28 above, other 3′-carbalkoxy-[16,17-d]-2′-isoxazolines of Formulae I and II above can be hydrolyzed to the corresponding 3′-carboxy compounds, for example:

3′-carbomethoxy-6α-fluoro-11β,21-dihydroxy-3,20-dioxo-4-pregneno-[16,17-d]-2′-isoxazoline to 3′-carboxy-6α-fluoro-11β,21-dihydroxy-3,20-dioxo-4-pregneno-[16,17-d]-2′-isoxazoline, 3′-carbethoxy-3β-hydroxy-20-oxo-5β-pregnano-[16,17-d]-2′-isoxazoline 3-acetate to 3-carboxy-3β-hydroxy-20-oxo-5β-pregnano-[16,17-d]-2′-isoxazoline and the like.

EXAMPLE 29

*6α-methyl-16α-cyano-17α-hydroxypregn-4-ene-3,20-dione*

A suspension of 4.13 g. of 6α-methyl-3′-carboxy-3,20-dioxo-4-pregneno-[16,17-d]-2′-isoxazoline in xylene (75 ml.) was stirred under reflux for about 1.5 hours. During this time the solids gradually dissolved to give a pale yellow solution. Upon cooling to 5° C. a crystalline product (0.79 g.) separated which was collected and recrystallized several times from aqueous dimethylformamide to give 0.37 g. of 6α-methyl-16α-cyano-17α-hydroxypregn-4-ene-3,20-dione, M.P. 259–266° C.

*Analysis.*—Calcd. for $C_{23}H_{31}NO_3$: C, 74.76; H, 8.46; N, 3.79. Found: C, 74.59; H, 8.48; N, 3.94.

EXAMPLE 30

*6α-methyl-16α-cyano-17α-hydroxypregn-4-ene-3,20-dione*

A solution of 2.5 g. of 6α-methyl-3′-carboxy-3,20-dioxo-4-pregneno-[16,17-d]-2′-isoxazoline in 40 ml. of xylene and 10 ml. of collidine was stirred under reflux for about 0.25 hour. The solution was then cooled to about 5° C. to give 1.89 g. of crystalline product, M.P. 246–255° C. The product thus obtained was recrystallized several times from aqueous dimethylformamide to give 1.62 g. of 6α-methyl-16α-cyano-17α-hydroxypregn-4-ene-3,20-dione, M.P. 259–266° C.

EXAMPLE 31

*16α-cyano-11β,17α,21-trihydroxypregna-1,4-diene-3,20-dione 21-acetate*

A suspension of 6.35 g. of 3′-carboxy-11β,21-dihydroxy - 3,20-dioxo-1,4-pregnadieno-[16,17-d]-2′-isoxazoline 21-acetate in 100 ml. of xylene and 25 ml. of 2,4,6-trimethylpyridine was heated at reflux for 15 minutes during which time most of the solids dissolved. The mixture was cooled to 25° C. and decanted from a tarry residue. The supernatant was diluted to 500 ml. with ether, was washed with 1 N hydrochloric acid, saturated brine and then dried and evaporated to give 3.98 g. of a gum. Trituration with methylene chloride left a crystalline residue of 16α-cyano-11β,17α,21-trihydroxypregna-1,4-diene-3,20-dione 21-acetate which crystallized from acetone as a solvate, M.P. 234–237° C.

*Analysis.*—Calcd. for $C_{24}H_{29}NO_6 \cdot C_3H_6O$: C, 66.78; H, 7.27; N, 2.88. Found: C, 66.59; H, 7.00; N, 2.92.

In the same manner following the procedure of Examples 29, 30 and 31, above, other 3′-carboxy-[16,17-d]-2′-isoxazolines of Formulae I and II can be decarboxylated to the corresponding 16α-cyano-17α-hydroxy compounds, for example, those named in the last paragraph of Example 28, above, to obtain:

16α-cyano-6α-fluoro-11β,17α,21-dihydroxypregna-4-ene-3,20-dione, and

16α-cyano-3β,17α-dihydroxy-5β-pregnan-20-one 3-acetate, respectively, and the like.

We claim:

1. A compound of the formula:

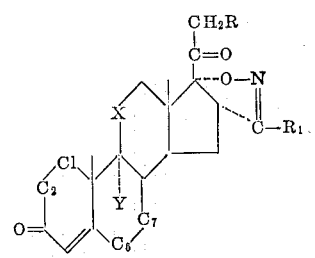

wherein R is selected from the group consisting of hydrogen, hydroxy and acyloxy, in which acyl is the acyl radical of a hydrocarbon carboxylic acid of 1 to 12 carbon atoms, inclusive; $R_1$ is selected from the group consisting of hydrogen, lower-alkyl of 1 to 8 carbons, inclusive, aryl of 6 to 12 carbon atoms, inclusive, halogen, carboxy and carbalkoxy, in which the alkyl radical is lower-alkyl as hereinbefore defined; X is selected from the group consisting of methylene, β-hydroxymethylene and carbonyl; Y is selected from the group consisting of hydrogen, fluorine and chlorine; —$C_1$—$C_2$— is selected from the group consisting of the divalent radicals: —$CH_2$—$CH_2$— and —CH=CH—; —$C_6$—$C_7$— is selected from the group consisting of the divalent radicals:

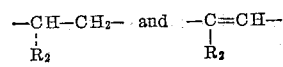

in which the $R_2$ at the 6-position is selected from the group consisting of hydrogen, methyl, fluorine and chlorine; and wherein when X is methylene Y is limited to hydrogen.

2. A compound of the formula:

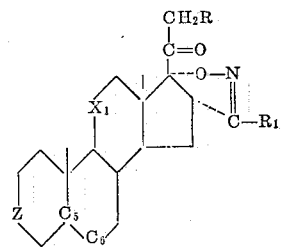

wherein R is selected from the group consisting of hydrogen hydroxy and acyloxy, in which acyl is the acyl radical of a hydrocarbon carboxylic acid of 1 to 12 carbon atoms, inclusive; $R_1$ is selected from the group consisting of hydrogen, lower-alkyl of 1 to 8 carbon atoms, inclusive, aryl of 6 to 12 carbon atoms, inclusive, halogen, carboxy or carboalkoxy in which the alkyl radical is lower-alkyl as hereinbefore defined; $X_1$ is selected from the group consisting of methylene, β-hydroxymethylene, α-hydroxymethylene and carbonyl; Z is selected from the group consisting of carbonyl, α-hydroxymethylene, β-hydroxymethylene, α-acyloxymethylene and β-acyloxymethylene, in which acyl has the meaning hereinbefore defined; and

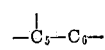

is selected from the group consisting of the trivalent radicals:

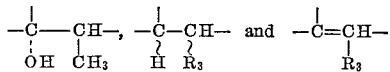

in which $R_3$ at the 6-position is selected from the group consisting of hydrogen and methyl.

3. 3'-methyl-11β,21-dihydroxy-3,20-dioxo-1,4-pregnadieno-[16,17-d]-2'-isoxazoline 21-acetate.

4. 3',6α-dimethyl-9α-fluoro-11β,21-dihydroxy-3,20-dioxo-4-pregneno-[16,17-d]-2'-isoxazoline 21-acetate.

5. 3',6β-dimethyl-5α,11β,21-trihydroxy-3,20-dioxo-pregnano-[16,17-d]-2'-isoxazoline-3-[β,β-dimethyl-propylene α-γ-diol]-ketal 21-acetate.

6. 3'-methyl-3β-hydroxy-20-oxo-5-pregneno-[16,17-d]-2'-isoxazoline 3-acetate.

7. 3',6α-dimethyl-3,20-dioxo-4-pregneno-[16,17-d]-2'-isoxazoline.

8. 3'-methyl-9α-fluoro-11β,21-dihydroxy-3,20-dioxo-1,4-pregnadieno-[16,17-d]-2'-isoxazoline 21-acetate.

9. 3'-phenyl-11β,21-dihydroxy-3,20-dioxo-1,4-pregnadieno-[16,17-d]-2'-isoxazoline 21-acetate.

10. 6α-methyl-3'-phenyl-3,20-dioxo-4-pregneno-[16,17-d]-2'-isoxazoline.

11. 3'-phenyl-3β-hydroxy-20-oxo-5-pregneno-[16,17-d]-2'-isoxazoline 3-acetate.

12. 3'-chloro-11β,21-dihydroxy-3,20-dioxo-1,4-pregnadieno-[16,17-d]-2'-isoxazoline 21-acetate.

13. 3'-carbethoxy-11β,21-dihydroxy-3,20-dioxo-1,4-pregnadieno-[16,17-d]-2'-isoxazoline 21-acetate.

14. 3'-carbethoxy-3β-hydroxy-20-oxo-5-pregneno-[16,17-d]-2'-isoxazoline 3-acetate.

15. 3'-carbethoxy-3β-hydroxy-20-oxo-5β-pregnano-[16,17-d]-2'-isoxazoline 3-acetate.

16. 6α-methyl-3'-carbethoxy-3,20-dioxo-4-pregneno-[16,17-d]-2'-isoxazoline.

17. 3'carboxy-11β,21-dihydroxy-3,20-dioxo-1,4-pregnadieno-[16,17-d]-2'-isoxazoline 21-acetate.

18. 6α-methyl-3'-carboxy-3,20-dioxo-4-pregneno-[16,17-d]-2'-isoxazoline.

References Cited

Morersch et al.: Jour. Org. Chem., vol. 30, pp. 1272–74, April 1965.

Wiley: The Chem. of Heterocyclic Compounds (Five and Six Membered Compounds with Nitrogen and Oxygen), pp. 99–101 (1962), Interscience Publishers, N.Y.

LEWIS GOTTS, *Primary Examiner.*

H. A. FRENCH, *Assistant Examiner.*